JAMES S. TOPHAM.
Shawl Strap and Traveling Bag Holder.
No. 123,524.  Patented Feb. 6, 1872.
Fig. 1.
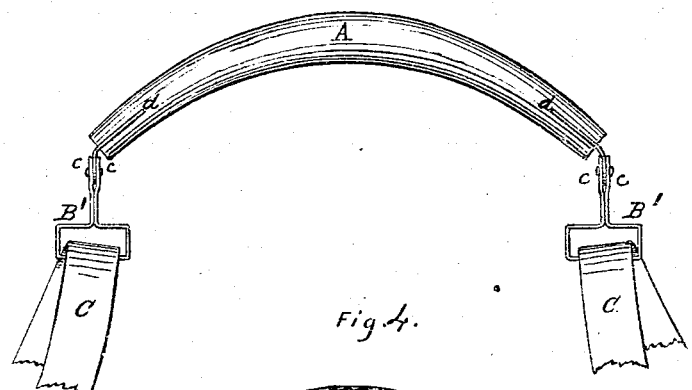
Fig. 2.
Fig. 4.
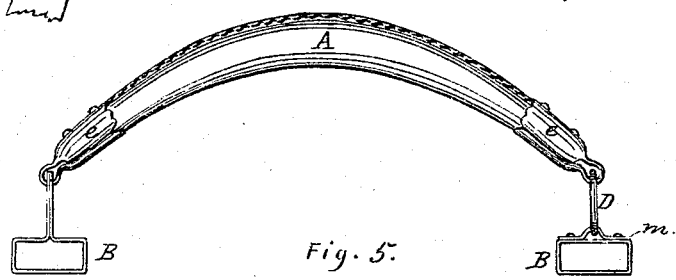
Fig. 5.
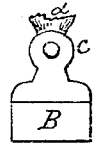
Fig. 3.
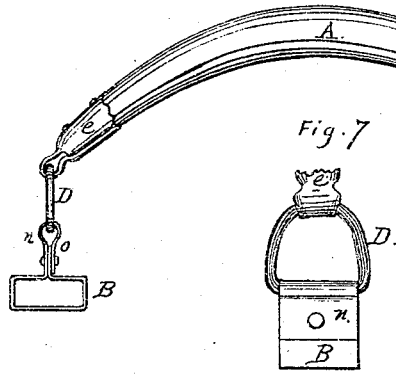
Fig. 7.
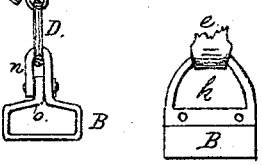
Fig. 8.
Fig. 6.
Witnesses.  
W. Burris  
G. E. W. Sharretts
Inventor.  
James S. Topham  
By G. B. Towes  
his Attorney in fact

123,524

UNITED STATES PATENT OFFICE.

JAMES S. TOPHAM, OF WASHINGTON, DISTRICT OF COLUMBIA.

IMPROVEMENT IN SHAWL-STRAPS AND TRAVELING-BAG HOLDERS.

Specification forming part of Letters Patent No. 123,524, dated February 6, 1872.

*To all whom it may concern:*

Be it known that I, JAMES S. TOPHAM, of Washington city, in the District of Columbia, have invented a new and Improved Shawl-Strap and Traveling-Bag Handle; and I do hereby declare that the following is a full, clear, and exact description of the construction and operation of the same, reference being had to the accompanying drawing making a part of this specification, in which—

Figure 1 is a view of the handle before it is bent. Fig. 2 is a view of the handle after it is bent, with loops attached. Fig. 3 is an end view of loop detached. Fig. 4 is a view of handle covered with leather, and showing modifications of loop and the manner of attaching it. Fig. 5 is a view of handle, showing another modification of loop and the manner of attaching it. Fig. 6 is a view showing modification of handle. Fig. 7 is an end view of loop of Fig. 5 detached. Fig. 8 is an end view of the loop at left hand of handle of Fig. 4 detached.

Like letters in the different figures of the drawing indicate like parts.

Shawl-straps and traveling-bag handles are usually made of leather, the ends connecting by rings with leather loops fastened to a base of stiff or stout leather. The handle being of a flexible nature, the object of the leather base is to keep the handle extended or from doubling up, which would otherwise occur in the strapping up of the shawl or other article. Now, my invention consists of a rigid curved handle, in combination with loops, to receive and hold the straps so as to dispense with the leather base, and thus cheapen the manufacture and sale of the article; also, of loops attached to said handle to receive and hold the straps, the ends of said loops being constructed to embrace and have a pivotal connection with plates or shanks fastened in slits made in the ends of the handle.

A is the handle, of hickory or other suitable wood, which is first made round and tapering from the centre to each end in a lathe. (See Fig. 1.) It is then steamed or soaked in hot water until it is pliable enough to bend, after which it is put into a clamp, one side of which is of a convex form, and the other concave. Pressure is then applied to the clamp until the handle is bent into the shape as seen in Fig. 2. The handle can be made of sheet metal or gutta-percha, and if of the latter I form the gutta-percha around a plate or round rod having the required curve to give it the necessary strength, the plate projecting out from each end of the handle, so that the loops can be easily connected therewith; or, if preferable, it can be made by cutting out two pieces from wood with a scroll-saw, and then riveting each piece $a$ to each side of a plate, $b$, having the proper curve, the plate being left to project enough from the ends to attach the loops. (See Fig. 6.) The handle seen in Fig. 3 is covered with leather, the edges of which are sewed together on the upper side thereof. This is only done as a matter of taste, to give the handle a smooth and nice finish. B are the loops to receive and hold the straps C. They are cut and formed, in any well-known manner, from sheet metal or leather, the ends $c$ of the loops being brought together and fastened by rivets, excepting the upper part, which is made to embrace and have a pivotal connection with plates $d$, which are inserted and fastened by rivets in slits made in the ends of the handle, the plates being left to project enough from the ends for the purpose and bent down to connect properly with the ends of the loops. The modifications of loop seen in Figs. 4, 5, 6, and 7 consist in constructing the loop so as to attach it by rings D either with the eye of the ordinary cap $e$, attached to the end of the handle, or the eye of a plate, $h$, fastened in a slit made in the end of the same, as may be preferred, the eye of the plate being formed by passing it through and bending it over the ring, the ends being hammered tightly together and then inserted in the slit. The loop in Fig. 4 at the left-hand end of the handle has its ends brought squarely together, which are then soldered and riveted, and an opening, $k$, (see Fig. 8,) cut through for attaching it to the eye of the ordinary cap $e$; that in the same figure, at the right-hand end of the handle, has its ends made to terminate and form the loop, which is connected to the ring D by passing a small piece of sheet-metal plate, $m$, through the latter, and then riveting it down on the loop; that in Fig. 5 is constructed with one end, $n$, longer than the other, so that by passing the longer end through the ring and lapping it down over the shorter, o, and then riveting it thereto, an eye will be formed, by which it is connected to the ring.

Other modifications of the loop and the manner of attaching it might be mentioned; but those which have already been described are deemed sufficient for present practical use. The handle being rigid, it will be readily seen that no leather base, or other equivalent device, is required to keep the ends of the handle extended, thus saving considerable time and expense in the manufacture, and yet producing a better and more durable handle, which accomplishes the purpose equally as well as before.

I contemplate using the said rigid curved handle A in traveling-bags, the handle in that case being attached so as to have either a pivotal or ring connection with the bag-frame.

Claim.

Having thus fully described my invention, what I claim therein as new, and desire to secure by Letters Patent, is—

The rigid curved handle A, provided with loops B', attached by a pivotal or ring joint, substantially as described.

As evidence that I claim the foregoing as my invention, I have hereunto set my hand and seal in the presence of two witnesses.

JAMES S. TOPHAM. [L. S.]

Witnesses:
JAMES H. BUSHBY,
WM. DAW.